US009648369B2

(12) United States Patent
Frazier et al.

(10) Patent No.: US 9,648,369 B2
(45) Date of Patent: May 9, 2017

(54) CROSS-PLATFORM SCHEDULE MANAGEMENT INTERFACE

(75) Inventors: Kristopher T. Frazier, Frisco, TX (US); Michael J. Naggar, Dallas, TX (US); Mitch Dornich, Flower Mound, TX (US); Ashutosh K. Sureka, Coppell, TX (US); Alison Kay Allen, Dallas, TX (US); Nitin Khanna, Arlington, TX (US); Ryan Evans, Frisco, TX (US); Rahim Charania, Euless, TX (US); Lonnie Hiroshi Katai, Murphy, TX (US); Shuchi Patel, Frisco, TX (US); Kristi D. Crum, Mendhan, NJ (US)

(73) Assignees: Verizon Patent and Licensing Inc., Basking Ridge, NJ (US); Cellco Partnership, Basking Ridge, NJ (US)

( * ) Notice: Subject to any disclaimer, the term of this patent is extended or adjusted under 35 U.S.C. 154(b) by 358 days.

(21) Appl. No.: 13/493,414

(22) Filed: Jun. 11, 2012

(65) Prior Publication Data
US 2013/0332839 A1 Dec. 12, 2013

(51) Int. Cl.
| G06F 3/048 | (2013.01) |
| H04N 21/466 | (2011.01) |
| H04N 21/262 | (2011.01) |
| H04N 21/45 | (2011.01) |
| G06F 17/30 | (2006.01) |
| H04N 21/475 | (2011.01) |

(52) U.S. Cl.
CPC . *H04N 21/26258* (2013.01); *G06F 17/30964* (2013.01); *H04N 21/4532* (2013.01); *H04N 21/4668* (2013.01); *H04N 21/4756* (2013.01)

(58) Field of Classification Search
CPC .............................. G06F 3/048; H04N 21/466
USPC ........................................................ 715/738
See application file for complete search history.

(56) References Cited

U.S. PATENT DOCUMENTS

| 2009/0276722 | A1* | 11/2009 | Segel ............................ 715/765 |
| 2010/0099462 | A1* | 4/2010 | Baek .................... G06F 3/0485 455/566 |
| 2011/0239253 | A1* | 9/2011 | West et al. ...................... 725/46 |
| 2012/0079429 | A1* | 3/2012 | Stathacopoulos et al. ... 715/830 |
| 2012/0159337 | A1* | 6/2012 | Travilla et al. ............... 715/738 |
| 2012/0272185 | A1* | 10/2012 | Dodson et al. ............... 715/810 |
| 2013/0238994 | A1* | 9/2013 | Yurasits ................ G06F 3/0482 715/716 |

\* cited by examiner

*Primary Examiner* — Xuyang Xia

(57) ABSTRACT

A method includes presenting a user interface providing access to content from multiple content providers and receiving, via the user interface, user input indicating selection criteria for recommending content. The selection criteria include an amount of time available to the user. The method includes providing, to a network device, an indication of the selection criteria and receiving, from the network device, information for providing recommended content options based on the selection criteria. The recommended content options are available from different content providers of the multiple content providers. The method includes presenting, to the user and via the interface, the recommended content options in association with the selection criteria.

20 Claims, 13 Drawing Sheets

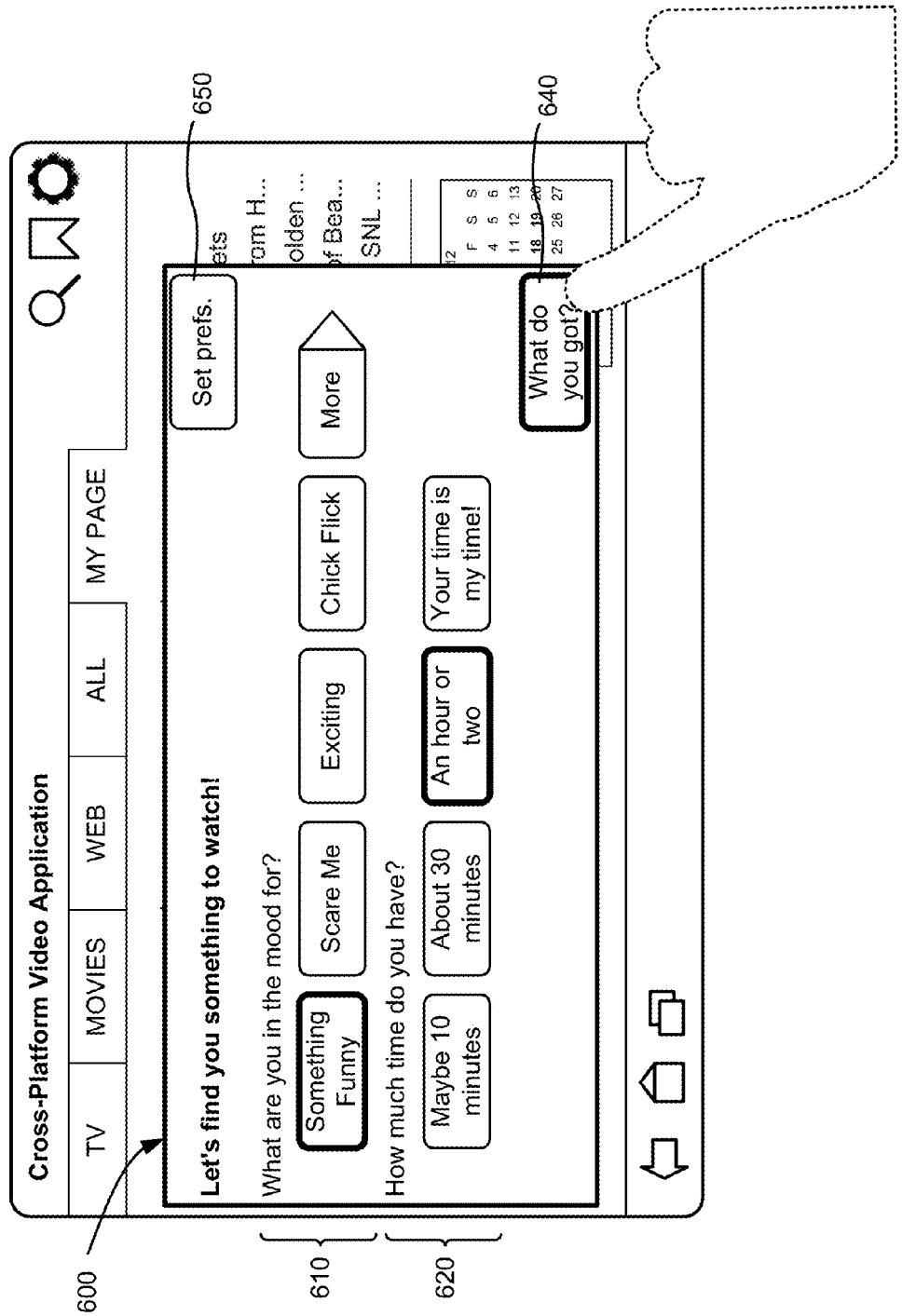

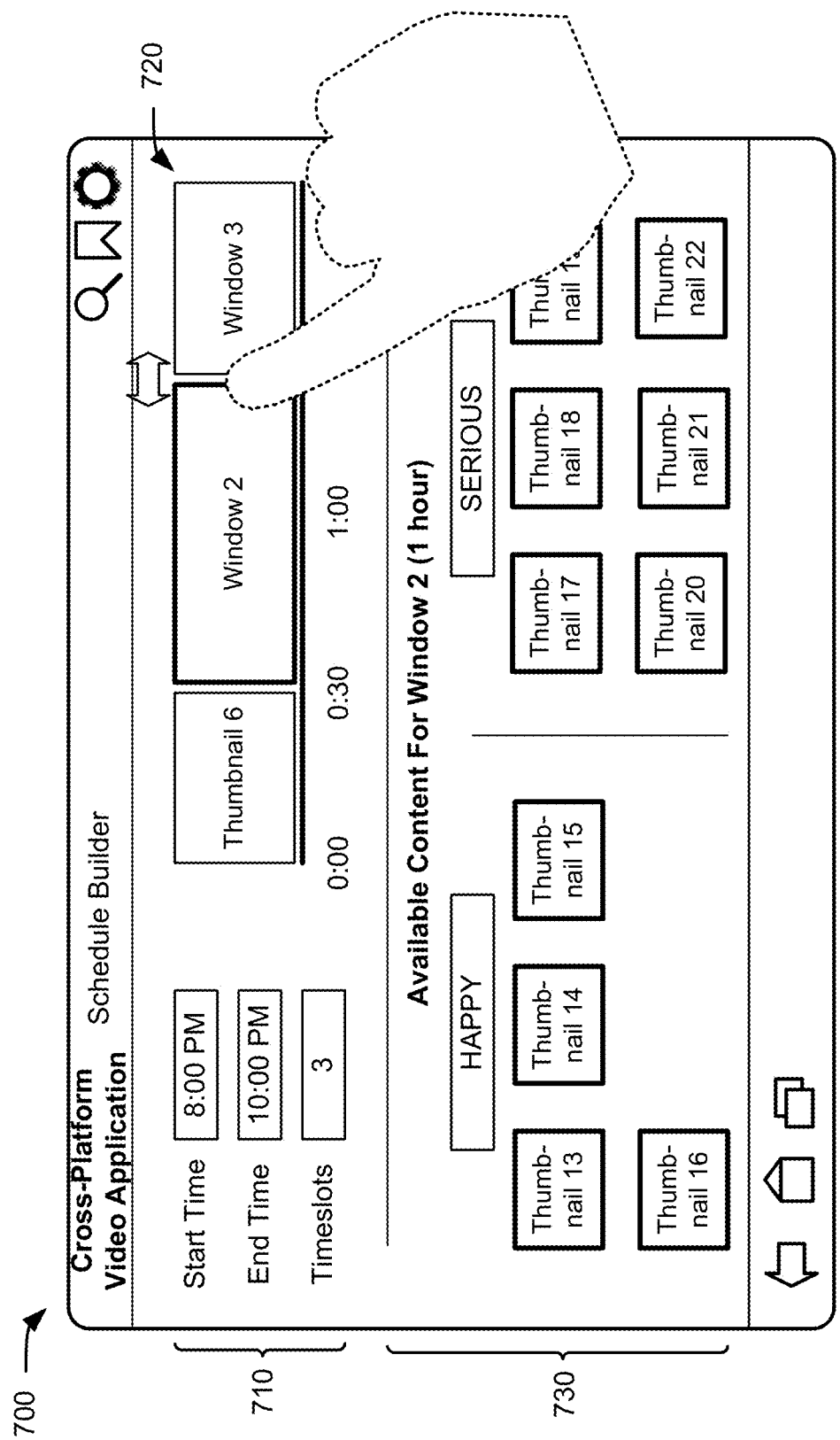

CROSS-PLATFORM SCHEDULE MANAGEMENT INTERFACE

BACKGROUND

Modern telecommunications systems offer subscribers a number of different communications services, such as television service, data service, and telephone services. Subscribers to such services have access to an ever-growing amount and variety of content, services, and equipment, such as broadcast television content, non-broadcast television content (often referred to as "cable" television content), on demand and pay-per-view content, wireless services, widgets, applications, etc. Subscribers may purchase or subscribe to available content or services by communicating with their providers.

BRIEF DESCRIPTION OF THE DRAWINGS

FIGS. 6A and 6B are diagrams of an exemplary interface associated with the mood assistant of FIG. 5;

FIGS. 7A-7C are diagrams of an exemplary interface associated with the schedule builder of FIG. 5;

DETAILED DESCRIPTION OF PREFERRED EMBODIMENTS

The following detailed description refers to the accompanying drawings. The same reference numbers in different drawings may identify the same or similar elements.

Systems and methods provided herein may include a user interface for scheduling content from multiple content providers in a cross-platform application that allows users to conveniently select, purchase, and/or present content from multiple sources and in multiple formats. Content may include, for example, multimedia content such as digital video, audio, games, physical media, and other forms of content. The systems and methods may present a user interface that provides access to content from multiple content providers and may receive, via the user interface, user input indicating selection criteria for recommending content. The selection criteria may include an amount of time available to the user. The systems and methods may include providing, to a network device, an indication of the selection criteria and receiving, from the network device, information for providing recommended content options based on the selection criteria. The recommended content options may be available from different content providers of the multiple content providers. The systems and methods may include presenting, to the user and via the interface, the recommended content options in association with the selection criteria.

Figure 1:
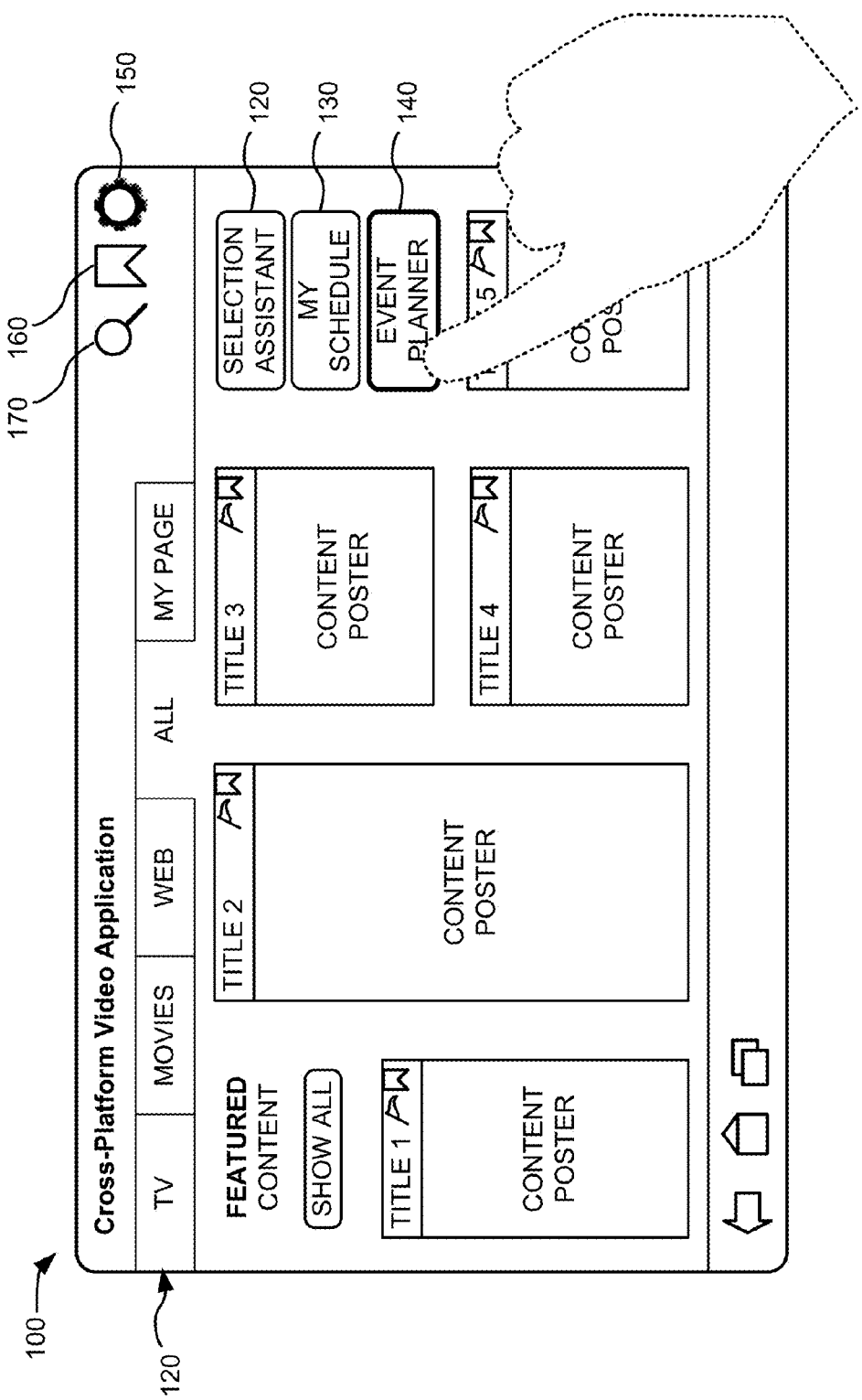
FIG. 1 is a diagram illustrating an exemplary implementation of a user interface, as described herein.

FIG. 1 is a diagram illustrating an exemplary implementation of the concepts described herein. An application, executed on a user device, may provide a platform to conveniently select and present multimedia content from multiple sources. For example, the application may provide a platform for content delivered over an IP network from service providers and respective services (e.g., "cable" television services with cross-platform content delivery), streaming content services, content downloading services, and ad-hoc media services. As shown in FIG. 1, a user interface 100 may provide options to select from different content titles (e.g., "Title 1", "Title 2," etc.) and content groupings 110 (e.g., "TV," "Movies," "Web," or "All") across multiple content providers. Some or all of the multiple content providers may require separate accounts/subscriptions to access their respective content. Thus, user interface 100 may provide the convenience of allowing a user to browse through content offerings associated with multiple user accounts/subscriptions in a single user interface.

User interface 100 may also provide options to select, schedule, or view available content across multiple service providers. As shown in FIG. 1, user interface 100 may include a "selection assistant" option 120, a "my schedule" option 130, and an "event planner" option 140. As described further herein, selection assistant option 120 may launch an interface to prompt a user with available content options based on a user's mood and/or available time. My schedule option 130 may launch an interface to enable a user to schedule content presentation for an upcoming time period, which may account for local or remote (e.g., travel) conditions. Event planner option 140 may launch an interface to enable a user to schedule content presentation for a particular event, such a group viewing event.

User interface 100 may also include a settings module (which may be accessed via settings icon 150) to enable a user to adjust the presentation and/or configuration of the cross-platform application. User interface 100 may also include a bookmark feature (which may be accessed, for example, via bookmark icon 160) and a search feature (which may be accessed, for example, via search icon 170). The bookmark feature may permit a user to mark particular pages and/or content for future retrieval. The search feature may provide an interactive search interface to search for particular content. The arrangement and type of options in user interface 100 may vary in different implementations and may be user configurable.

Figure 2:
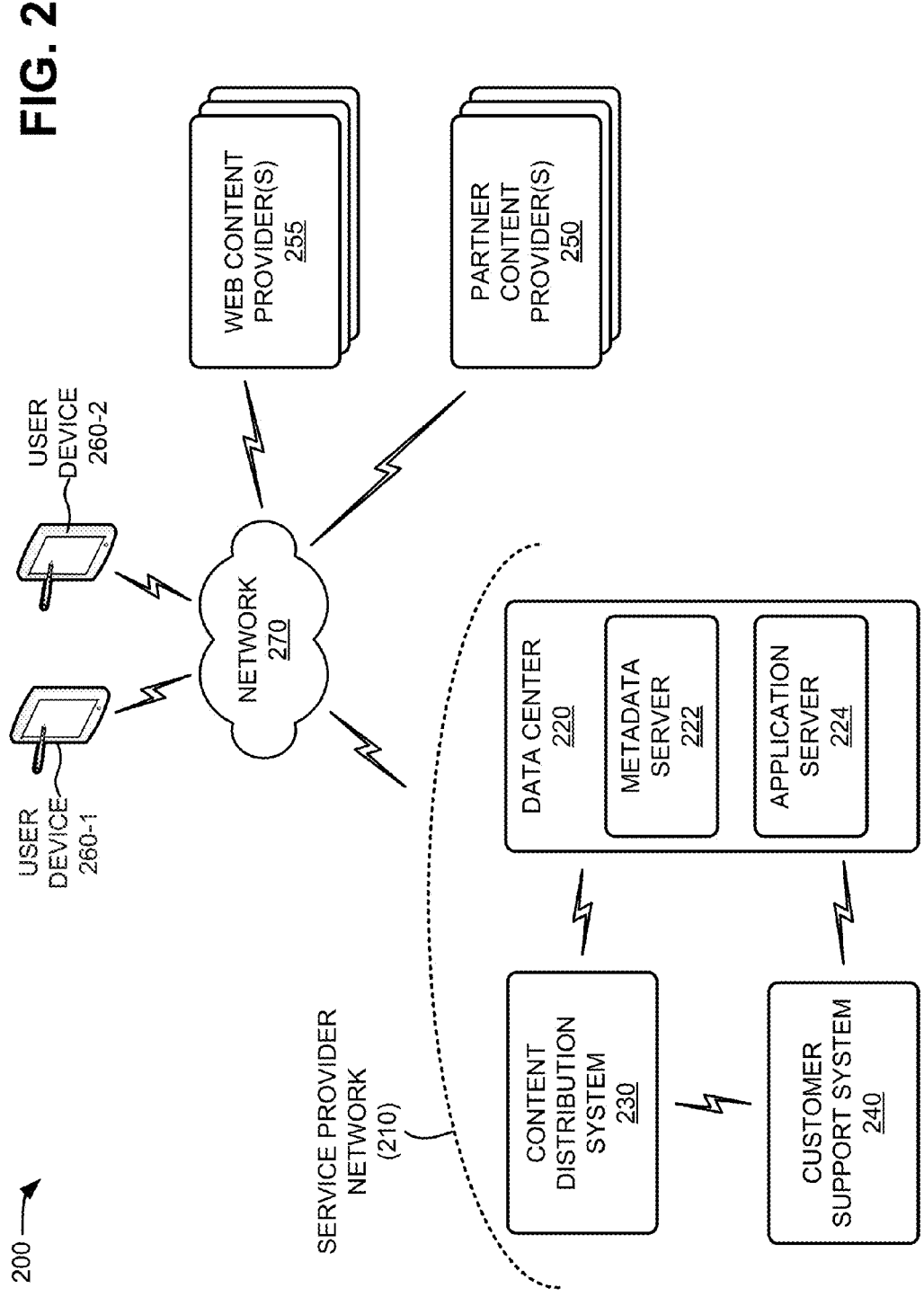
FIG. 2 is a diagram illustrating an exemplary network environment in which systems and/or methods described herein may be implemented.

FIG. 2 illustrates an exemplary network environment 200 in which systems and methods described herein may be implemented. As illustrated, network environment 200 may include a service provider network 210 that further includes a data center 220, a content distribution system 230, and a customer support system 240; partner content providers 250; web content providers 255; and user devices 260-1 and 260-2 (collectively "user devices 260" and individually "user device 260") interconnected by a network 270.

Service provider network 210 may include network devices to provide a cross-platform application and/or content delivery services to subscribers. Service provider network 210 may also manage data collection for content available from partner content providers 250 and/or web content providers 255. Service provider network 210 may include, for example, one or more private IP networks that use a private IP address space. Service provider network 210 may include a local area network (LAN), an intranet, a private wide area network (WAN), etc. In one implementation, service provider network 210 may implement one or more Virtual Private Networks (VPNs) for providing communication between, for example, any of data center 220, content distribution system 230, and customer support system 240. Service provider network 210 may be protected/ separated from other networks, such as network 270, by a firewall. Although shown as a single network in FIG. 2, service provider network 210 may include a number of separate networks.

Data center 220 may manage user authentication, authorization for playing content, selection of content, and/or purchase of content by a user of user devices 260. As shown in FIG. 2, data center 220 may include, for example, a metadata server 222 and an application server 224. In one implementation, data center 220 may be accessed by user devices 260 via network 270.

Metadata server 222 may provide a unified catalog of digital content for users (e.g., of user devices 260) to consume (e.g., view, buy, rent, or subscribe). In one implementation, metadata server 222 may collect and/or present listings of content available to particular users and/or particular user devices 260. For example, metadata server 222 may receive content metadata from content distribution system 230, partner content providers 250, and/or web content providers 255. Content metadata may include, for example, titles, descriptions, images, talent, genres, times, durations, access information, etc. associated with particular content. Metadata server 222 may use the content metadata to provide available content options to cross-platform applications running on user devices 260 (e.g., based on active subscriptions/accounts with content providers 250 and/or web content providers 255). Metadata server 222 may provide the content metadata to user device 260 directly or may communicate with user device 260 via application server 224.

Application server 224 may provide a backend support system for cross-platform applications residing on user devices 260. For example, application server 224 may permit user device 260 to download a cross-platform application that enables a user to find content of interest, cross reference content, order content, and/or play downloaded or streaming content from any of multiple content providers (e.g., content distribution system 230 and partner content providers 250). In one implementation, application server 224 may include recommendation engine to store (or access) user profile data to provide content recommendations to a user. In some implementations, the downloaded cross-platform application may participate in registration of user device 260 with the multiple content providers.

Once user device 260 is registered with a content provider, the downloaded cross-platform application may enable user device 260 to present, to a user of user device 260, information received from data center 220 in an interactive format, to allow selection of particular digital content. Application server 224 may also provide content metadata to user device 260. In implementations described herein, application server 224 may perform backend services to support features of a cross-platform application operating on user device 260. For example, application server 224 may perform searches based on user input received from user device 260 and provide search results to user device 260. Additionally, or alternatively, application server 224 may provide notifications to user device 260 based on user input. Interactions between application server 224 and user device 260 may be performed, for example, using hypertext transfer protocol (HTTP) or secure HTTP (HTTPS) via network 270. The cross-platform application may coordinate with content distribution system 230 and partner content providers 250 in authorizing user device 260 to access selected content.

Content distribution system 230 may aggregate content and metadata, process content, and distribute content. For example, content distribution system 230 may receive, capture, and encrypt video streams of online live television programs and tag captured content with an identifier, channel identifier, program identifier, airing time, etc. In another example, content distribution system 230 may transcode content into a digital format suitable for consumption on particular user devices 260. In some implementations, content distribution system 230 may include a transcoder (hardware or software) to convert a video file from one format to another (e.g., from one bit rate to another bit rate, from one resolution to another, from one standard to another, from one file size to another, etc.).

In one implementation, content distribution system 230 may include a content delivery system and/or a digital rights management (DRM) server. The content delivery system may deliver digital content from a backend server to user devices 260 via, for example, a content delivery network (CDN). For example, the content delivery system may include a server that provides streaming data (e.g., via a streaming universal resource locator (URL)) to user devices 260 (e.g., via public network 270). The DRM server may issue, validate, and/or enforce DRM licenses to a client, such as a cross-platform application running on one of user devices 260.

Customer support system 240 may provide an interface to receive and respond to customer inquiries (e.g., regarding use of a cross-platform application on user device 260). In one implementation, customer support system 240 may include interfaces for accessing data center 220, content distribution system 230, and/or partner content providers 250 to receive usage reports and/or track usage history to resolve questions, billing disputes, etc.

Partner content provider 250 may aggregate content and metadata, process content, and distribute content. Content may be the same or different content than available from content distribution system 230, web content providers 255, and/or another partner content provider 250. Examples of partner content provider 250 may include, for example, subscriptions services for over-the-top (OTT) video and/or other streaming media services. OTT video content may include, for example, live content streams, pre-recorded video content (e.g., television episodes), and content associated with video portals provided by content providers, such as Hulu Plus, Netflix, YouTube, Amazon Prime, CNN, etc. In other implementation, partner content providers 250 may also include physical media (e.g., DVD, BluRay discs, etc.) distribution outlets.

Each of partner content providers 250 may coordinate with components of service provider network 210 to provide authentication procedures and metadata for its respective content. In one implementation, partner content provider 250 may provide content metadata to service provider network 210 (e.g., metadata server 222) so that user devices 260 executing a cross-platform application (e.g., provided by service provider network 210) may select content available from partner content provider 250. Based on the metadata, user devices 260 may provide interfaces to cross-reference content across platforms, access selected content, and retrieve the selected content from partner content providers 250.

Web content providers 255 may include a web server to host Internet-based websites, such as content sharing websites (e.g., YouTube, Blip, Veoh, Flikr, etc.), social networking websites (e.g., Twitter, Facebook, Myspace, etc.), blog websites, search engine websites (e.g., Google, Yahoo, etc.), message board websites, etc. In one implementation, web content providers 255 may provide content and/or metadata to user device 260 to allow, for example, a cross-platform application residing on user device 260 to cross-reference web content with other metadata from data center 220. In another implementation, one or more devices of data center 220 may retrieve metadata from web content providers 255.

User device 260 may include a computational or communication device. User device 260 may enable a user to view video content or interact with another user device 260 or a video display device (e.g., a set-top box and/or television). User device 260 may include, for example, a personal communications system (PCS) terminal (e.g., that may combine a cellular radiotelephone with data processing and data communications capabilities), a tablet computer, a smartphone, a personal computer, a laptop computer, a gaming console, an Internet television, or other types of computational or communication devices.

User device 260 includes a cross-platform application that enables user device 260 to communicate with, for example, service provider network 210, partner content providers 250, and/or web content providers 255. The cross-platform application may provide a single interface to select and view content from multiple content sources. For example, the cross-platform application may permit a user of user device 260 to login to an account (e.g., via application server 224) and access catalog information (e.g., from metadata server 222) for content from multiple providers (e.g., content distribution system 230, partner content providers 250, etc.). The cross-platform application may allow a user to select particular content, access another provider account (if necessary), schedule content presentation, and/or consume live streaming video content (e.g., from content distribution system 230, partner content providers 250, or web content providers 255). The cross-platform application may also provide access to information from web content providers 255 independently from service provider network 210. As described further herein, the cross-platform application may also allow a user to select, schedule, and cross-reference content among the multiple providers.

Network 270 may include a local area network (LAN); an intranet; the Internet; a wide area network (WAN), such as a cellular network, a satellite network, a fiber optic network, a private WAN, or a combination of the Internet and a private WAN; etc., that is used to transport data. Although shown as a single element of network 200 in FIG. 2, network 270 may include a number of separate networks that function to provide services to user devices 260.

In FIG. 2, the particular arrangement and number of components of network environment 200 are illustrated for simplicity. In practice, network environment 200 may include more service provider networks 210, data centers 220, content distribution systems 230, customer support systems 240, partner content providers 250, web content providers 255, user devices 260, and/or networks 270. Components of network environment 200 may be connected via wired and/or wireless links.

Figure 3:
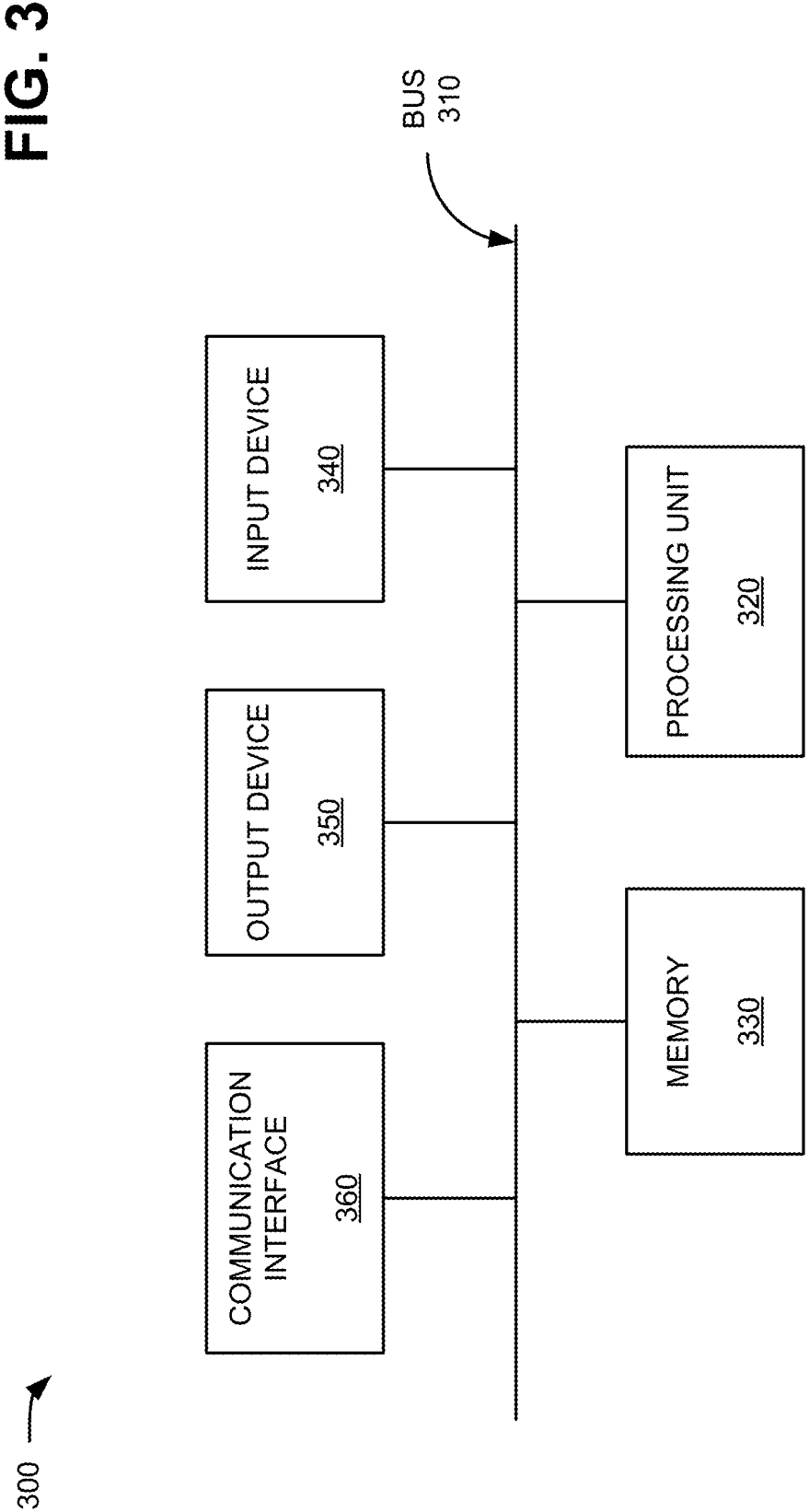
FIG. 3 is a block diagram of exemplary components of a device that may correspond to one of the devices of FIG. 2.

FIG. 3 is a diagram of exemplary components of a device 300. Each of data center 220, content distribution system 230, customer support system 240, partner content provider 250, web content providers 255, and user device 260 may be implemented/installed as software, or a combination of hardware and software, on one or more of device 300. As shown in FIG. 3, device 300 may include a bus 310, a processing unit 320, a memory 330, an input device 340, an output device 350, and a communication interface 360.

Bus 310 may permit communication among the components of device 300. Processing unit 320 may include one or more processors or microprocessors that interpret and execute instructions. In other implementations, processing unit 320 may be implemented as or include one or more application specific integrated circuits (ASICs), field programmable gate arrays (FPGAs), or the like.

Memory 330 may include a random access memory (RAM) or another type of dynamic storage device that stores information and instructions for execution by processing unit 320, a read only memory (ROM) or another type of static storage device that stores static information and instructions for the processing unit 320, and/or some other type of magnetic or optical recording medium and its corresponding drive for storing information and/or instructions. Memory 330 may be referred to herein as a "tangible non-transient computer-readable medium."

Input device 340 may include a device that permits an operator to input information to device 300, such as a keyboard, a keypad, a mouse, a pen, a microphone, one or more biometric mechanisms, and the like. Output device 350 may include a device that outputs information to the operator, such as a display, a speaker, etc.

Communication interface 360 may include any transceiver-like mechanism that enables device 300 to communicate with other devices and/or systems. For example, communication interface 360 may include mechanisms for communicating with other devices, such as other devices of network 200.

As described herein, device 300 may perform certain operations in response to processing unit 320 executing software instructions contained in a computer-readable medium, such as memory 330. A computer-readable medium may include a non-transitory memory device. A memory device may be implemented within a single physical memory device or spread across multiple physical memory devices. The software instructions may be read into memory 330 from another computer-readable medium or from another device via communication interface 360. The software instructions contained in memory 330 may cause processing unit 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows exemplary components of device 300, in other implementations, device 300 may include fewer components, different components, differently arranged components, or additional components than those depicted in FIG. 3. As an example, in some implementations, a display may not be included in device 300. In these situations, device 300 may be a "headless" device that does not include input device 340. Alternatively, or additionally, one or more components of device 300 may perform one or more other tasks described as being performed by one or more other components of device 300.

Figure 4:
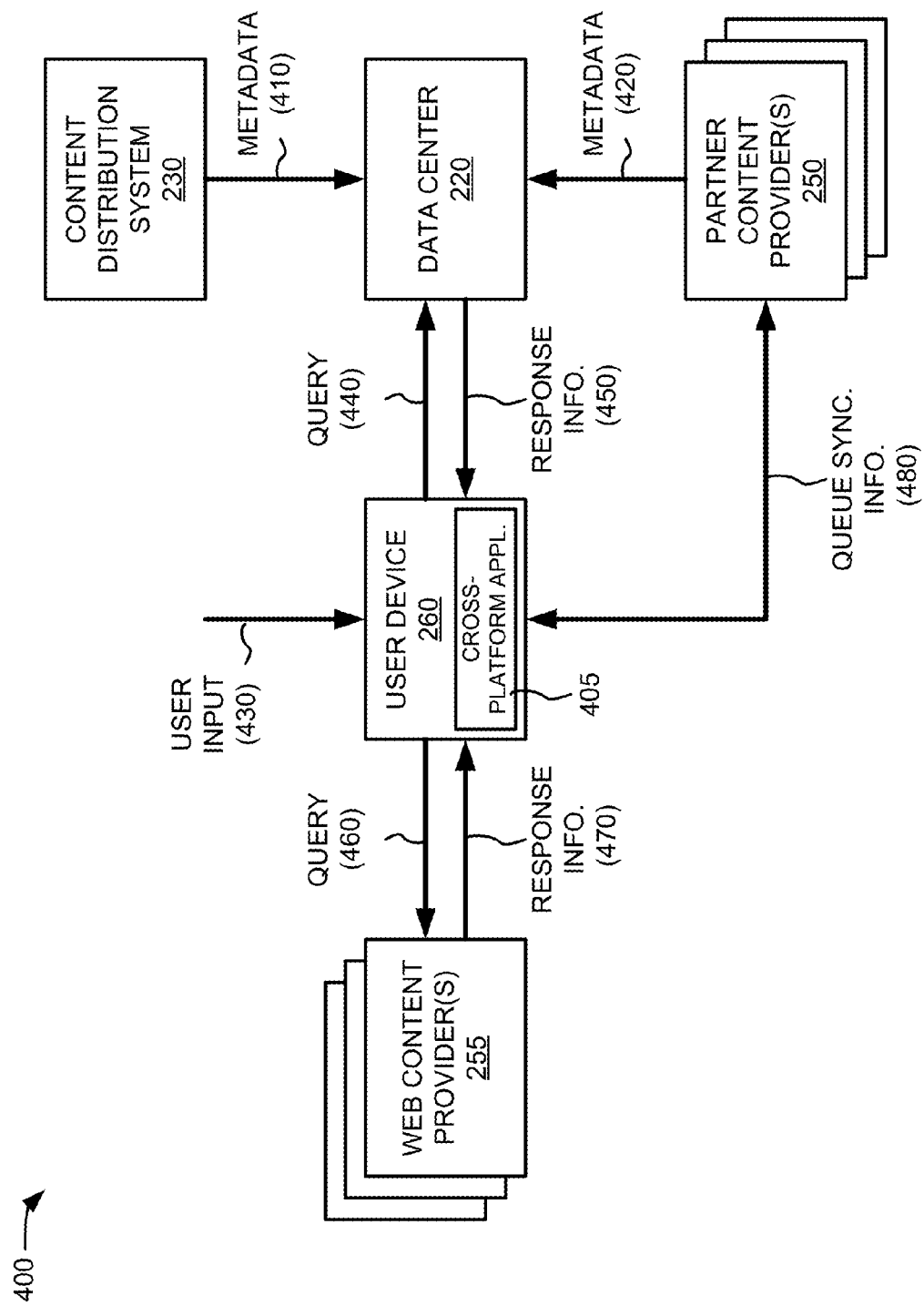
FIG. 4 is a diagram of exemplary communications between devices in the network of FIG. 2.

FIG. 4 is a diagram of exemplary communications for a portion 400 of network environment 200. Communications in FIG. 4 may represent communications to support selecting and/or scheduling content from multiple providers in a cross-platform application. As shown in FIG. 4, network environment portion 400 may include data center 220, content distribution system 230, partner content providers 250, web content providers 255, and user device 260 including a cross-platform application 405. Data center 220, content distribution system 230, partner content providers 250, web content providers 255, and user device 260 may include features described above in connection with, for example, FIGS. 1-3.

As described further herein, cross-platform application 405 may enable a user of user device 260 to find content of interest, cross reference content, order content, and/or play downloaded or streaming content from any of multiple content providers, such as content distribution system 230, partner content providers 250, and/or web content providers 255.

As shown in FIG. 4, content distribution system 230 may provide metadata 410 to data center 220. Metadata 410 may include, for example, content identifiers (e.g., a universal ID number, hash, etc.), titles, descriptions, images, talent, genres, times, durations, access information, etc. associated with particular content available through content distribution system 230. Similarly, each partner content provider 250 may provide metadata 420 to data center 220. Metadata 420 may include information associated with particular content available through partner content providers 250. Data center 220 may compile metadata 410 and metadata 420 for distribution to user devices 260/cross-platform application 405.

User device 260 may execute cross-platform application 405 and receive user input 430 from a user. For example, user device 260 may receive a user request via a user interface presented by cross-platform application 405. As described further herein, user input 430 may include, for example, a request via a selection assistant (e.g., associated with selection assistant option 120), a scheduling plan (e.g., associated with my schedule option 130), or an event request (e.g., associated with event planner option 140). User input 430 may also include search queries, browse commands, and/or navigation commands related with cross-platform application 405.

In response to user input 430, user device 260 may provide a query 440 to data center 220. Query 440 may include, for example, a request for information to support a response to user input 430. For example, if user input 430 is a request for a content recommendation (e.g., via a selection assistant based on particular mood and/or timing criteria), query 440 may include a query for content, available to the user that matches the particular mood and/or timing criteria. As another example, if user input 430 is a scheduling request, query 440 may include a query for content, available to the user, that corresponds to particular time periods.

Query 440 may trigger data center 220 to provide response information 450 to user device 260. Response information 450 may include, for example, a responsive subset of the compiled metadata from metadata 410 and metadata 420. Data center 220 may provide response information 450, which may be received by user device 260. Thus, for a particular query 440, data center 220 may provide responsive information about content for multiple platforms, including content from content distribution system 230 and partner content provider 250.

In some implementations, also in response to user input 430, user device 260 may provide a query 460 to one or more web content providers 255. Query 460 may include, for example, a request for supplemental information to support a response to user input 430. For example, if user input 430 is the same action (described above) for a content recommendation, query 460 may include a request for web content matching the user's criteria. Query 460 may be directed, for example, to a particular web content provider 255 (e.g., a YouTube server, etc.) or another server that compiles data from multiple web content providers. Web content providers 255 may provide response information 470 to user device 260. Response information 470 may include, for example, metadata related to web content (e.g., matching query 460) that is available to the user.

As described further herein, user device 260 may receive response information 450 and/or response information 470 and present results to a user. In one implementation, user device 260/cross-platform application 405 may receive response information 450 and response information 470 and may combine response information 450 and response information 470 into an interactive compilation for a user of user device 260. For example, in response to a single user input 430 query, user device 260/cross-platform application 405 may generate requests for and receive responses including content information from multiple content providers.

In response to user input 430, in some instances, user device 260 may provide synchronization information 480 to partner content providers 250 and/or receive synchronization information 480 from partner content providers 250. In other implementations, user device 260 and partner content providers 250 may exchange synchronization information 480 independent of user input 430 (e.g., as part of a periodic data exchange). User device 260 may, for example, implement application program interfaces (APIs) with individual partner content providers 250 to automatically synchronize queue information between a local queue of all content marked by a user and queues that are maintained for each individual partner content provider 250. Thus, queue selections made by the user via external communications with partner content providers 250 (e.g., communications not using cross-platform application 405) may be fed to user device 260/cross-platform application 405. The synchronized queue information may be used by user device 260, for example, to provide selection and/or scheduling recommendations in response to user input 430.

Although FIG. 4 shows exemplary interactions among components of network environment portion 400, in other implementations, network environment portion 400 may include fewer components, different components, differently-arranged components, and/or additional components than depicted in FIG. 4. Alternatively, or additionally, one or more components of network environment portion 400 may perform one or more other tasks described as being performed by one or more other components of network environment portion 400.

Figure 5:
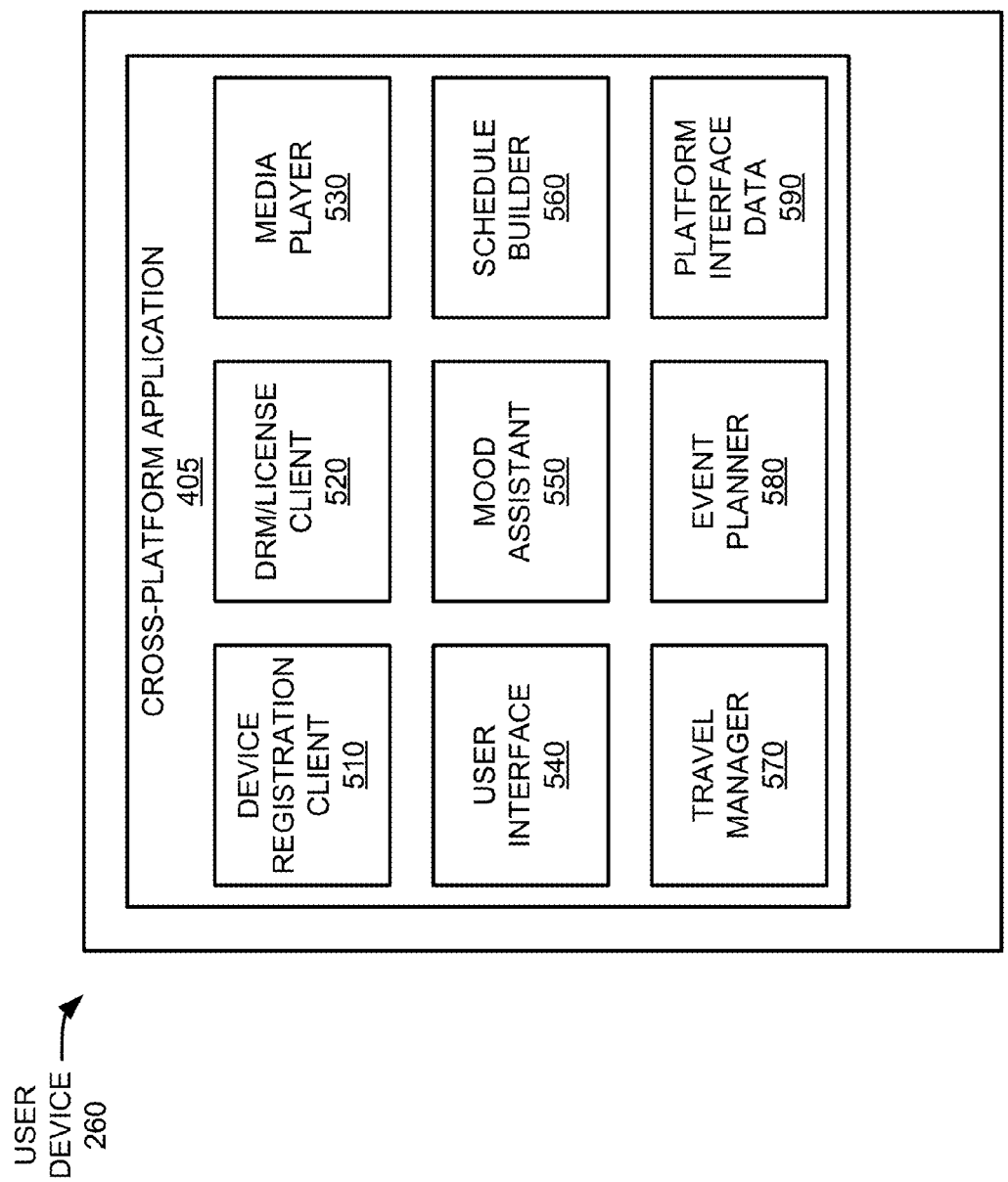
FIG. 5 is a block diagram of exemplary functional components of the user device of FIG. 2.

FIG. 5 is a block diagram of exemplary functional components of user device 260. The functions described in connection with FIG. 5 may be performed by one or more components of FIG. 3. As shown in FIG. 5, user device 260 may include a cross-platform application 405 including a device registration client 510, a DRM/license client 520, a media player 530, a user interface 540, a mood assistant 550, a schedule builder 560, a travel manager 570, an event planner 580, and platform interface data 590.

Cross-platform application 405 may include components downloaded, for example, from application server 224 in data center 220 when user device 260 contacts application server 224 to enable user device 260 to play content from/via service provider network 210. Cross-platform application 405 may coordinate with service provider network 210 and partner content providers 250 to provide a single interface for viewing content from multiple providers. In addition, cross-platform application 405 may enable user device 260 to perform functions that are described above, such as: playing video content; communicating with and/or presenting information received from data center 220 to a user; permitting a user of user device 260 to login to an account with service provider network 210 (e.g., via application server 224); permitting a user of user device 260 to login to an account with partner content providers 250 and/or web content providers 255; accessing catalog information (e.g., from metadata server 222); submitting an order; and/or consuming live streaming video content (e.g., from content distribution system 230 or partner content providers 250).

Depending on the implementation, cross-platform application 405 may include additional, fewer, different, or differently arranged components than those illustrated in FIG. 5. For example, in one implementation, cross-platform application 405 may not include media player 530. In such implementations, media player 530 may be or may have been installed on user device 260 as a separate application. For example, media player 530 may be a stand-alone application or installed as part of another application (such as an application associated with one or more of partner content providers 250) to present content to a user.

Device registration client 510 may participate in registration of user device 260. For example, device registration client 510 may initiate a registration with one or more of content distribution system 230 and partner content provider 250. For example, to start a registration with content distribution system 230, device registration client 510 may send a message to service provider network 210 to determine whether user device 260 is registered (e.g., recognized by service provider network 210 as a device that can receive content from service provider network 210). The message may include an identifier, also known as a client ID, which is associated and distributed with cross-platform application 405. Upon receipt of the message, service provider network 210 may indicate to device registration client 510 whether user device 260 has been registered at service provider network 210. If user device 260 has not been registered at service provider network 210, service provider network 210 may send an activation code and an activation URL to device registration client 510. In response, the user of user device 260 may manually register user device 260 with service provider network 210 for use of content distribution system 230.

The registration process may include the user using a web browser running on user device 260, visiting the activation URL provided by service provider network 210, authenticating the user/user device 260 at the activation URL, and upon successful authentication, inputting the activation code provided by service provider network 210. Upon successful registration, application server 224 may return a globally unique registration token to user device 260 when it contacts application server 224. User device 260 may store the registration token, the activation code, and/or the client ID as platform interface data 590.

Using APIs for partner content providers 250, device registration client 510 may perform similar registration procedures with particular partner content providers 250 (e.g., selected by a user of user device 260). Partner content providers 250 may provide the APIs for inclusion in cross-platform application 405. Data center 220 (e.g., application server 224) may provide a different API to user device 260 depending, for example, on the type of operating system included on user device 260. For example, an application server API may include a web (e.g., web 2.0) API, an Andriod® API, an iOS API, or a Windows CE API. User device 260 may also store the registration information for partner content providers 250 as platform interface data 590. In one implementation, the registration process may also provide configuration information for user device 260, such as display size, resolution, audio capabilities, etc.

DRM/license client 520 acquires licenses for content that is selected by a user for viewing or playing at user device 260. When a user selects particular content via user interface 540, cross-platform application 405 begins to download either metadata or the content from content distribution system 230 or partner content provider 250. Furthermore, DRM/license client 520 may send a request for a license to content distribution system 230 or partner content providers 250. The request may include all or a portion of platform interface data 590 (e.g., a registration token). If DRM/license client 520 receives a license for the selected content from content distribution system 230/partner content providers 250, DRM/license client 520 stores the license. The license may include a decryption key, for example, to decrypt the particular content. The particular content may be encrypted, for example, for copyright protection.

Media player 530 may decode and play content that is received via content distribution system 230, partner content providers 250, and/or web content providers 255. Media player 530 may output the decoded video to output components (e.g., output device 350) of user device 260.

User interface 540 may enable a user to browse available content, cross-reference content, manage presentation of content options, and select from available content. User interface 540 may also include an account login interface. For example, user interface 540 may request, from data center 220, a list of content available for downloading (e.g., from any of content distribution system 230 and partner content providers 250 for which the user of device 260 has registered) and may present the list of content to a user of user device 260. User interface 540 may include an interactive client interface that allows a user to provide input, such as user passwords, preferences, and selections from the list of available content. In one implementation, user interface 540 may indicate a user's selection to data center 220 and, in return, receive session-specific information to obtain the selected content. In implementations described herein, user interface 540 may also include various interfaces (e.g., associated with functional blocks described below) to suggest content options and manage content scheduling.

Mood assistant 550 may provide an interface to recommend content to a user based on real-time user input (e.g., user input 430). Choosing a piece of content is driven by the current mood of the user and/or how much time the user has to watch. Mood assistant 550 allows the user to smartly filter content based on the user's current mood. The user's mood preference may be expressed in common terms (e.g., funny, happy, scary, sad, mad, etc.) and then personalized for the user using, for example, a recommendation engine that factors in the genre, talent, year of release, the piece of content itself, and other information from a user's profile.

Mood assistant 550 can be further enhanced by allowing the user to filter content by how much time the user has available. For example, the user may select from defined increments, such as 15 minutes or less, 15-30 minutes, 30-60 minutes, 1-3 hours, or more than 3 hours. Mood assistant 550 cross-references movies, television, and web content and scrubs for appropriate mood-based and time-based content, as well. For example, user criteria may be used to filter the various content metadata to present recommendations for funny video clips that are 15 minutes or less.

Figure 6B:
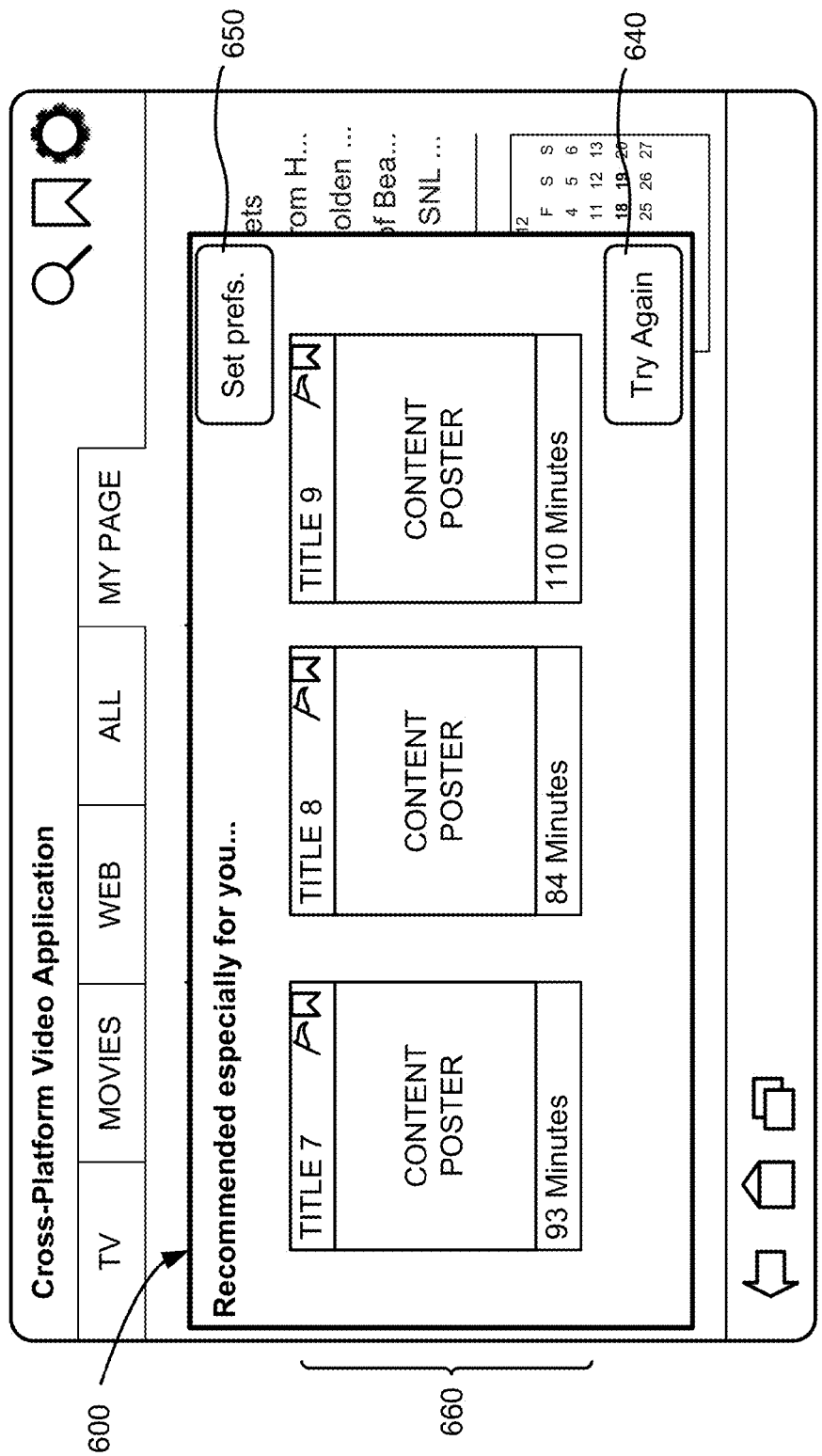

FIGS. 6A and 6B provide an exemplary user interface 600 associated with mood assistant 550. User interface 600 may be presented, for example, in response to a user's selection of selection assistant option 120 of user interface 100. User interface 600 may include a mood selector section 610 and a time selector section 620. Mood selector section 610 may include icons, buttons, or other selection mechanisms to allow a user to input a particular mood (e.g., "something funny," "scare me," etc.). Time selector section 620 may include icons, buttons, or other selection mechanisms to allow a user to input an available time period for viewing (e.g., "maybe 10 minutes," "about 30 minutes," etc.).

Assume a user, using interface 600, is in the mood to have a good laugh at a slapstick comedy and has about 90 minutes of time available. The user may select "Something Funny" from mood selector section 610, and "An hour or two" from time selector section 620. The user may submit the selections via a submission button 640. In one implementation, mood assistant 550 may submit the user criteria from interface 600 to data center 220 for a recommendation engine to select recommended content. In another implementation, mood assistant 550 may work with other functional components of cross-platform application 405 to generate a recommendation using metadata and user profile information from data center 220. As shown in FIG. 6B, one or more recommendations may be presented to a user in a recommendation section 660. For example, depending on user profile information, the combination of 'Something Funny' from mood selector section 610 and "An hour or two" from time selector section 620 could present recommendations for a Marx Brothers movie or a comedy starring Jim Carrey. In response to a user submission, mood assistant 550 may present one or multiple content recommendations.

Still referring to FIGS. 6A and 6B, a set preferences option 650 may provide an interface to permit a user to alter user preferences/profile data. For example, set preferences option 650 may provide a settings interface to set user preferences for preferred partner content providers 250, preferred content ratings (e.g., MPAA ratings or particular content review ratings). User preferences provided via set preferences option 650 may be used to filter content recommendations for mood assistant 550.

FIGS. 6A and 6B and other depictions herein include exemplary user interfaces which may be suitable for a particular type of user device 260, such as a tablet computer. However, in other implementations, user interfaces may include different information and/or arrangements that may be more suitable for different user devices. For example, in other implementations, a user interface may be provided for a smartphone, personal computer, internet television, or another type of user device 260.

Returning to FIG. 5, schedule builder 560 provides a time-based television schedule creator that helps a user decide what to watch (e.g., during a particular block of time) and builds a schedule to personalize the user's experience. In one implementation, schedule builder 560 can leverage features of mood assistant 550. For example, the user can state that he/she has two hours and schedule builder 560 will recommend a block of content that he/she can move like puzzle pieces to fit within that timeframe. In one implementation, the user can make adjustments to a suggested list as a whole or for specific titles, such as: Save for later, skip it, add another show or extend watch time.

Additionally, schedule builder 560 may permit the user to share a link (via email, SMS, or social networking properties) to the user's personalized schedule so others can watch the same program sequence (e.g., through a recipient's cross-platform application).

In one implementation, schedule builder 560 may populate provide content suggestions using content that is populated in the user's global queue. Additionally, or alternatively, schedule builder 560 may also include API's to interface with a local or remote digital video recorder (DVR) or linear television source (e.g., a set-top box). Thus, schedule builder 560 may also time-stitch multiple content items from content that is available on a user's DVR or linear television line-up in addition to OTT content.

Figure 7A:
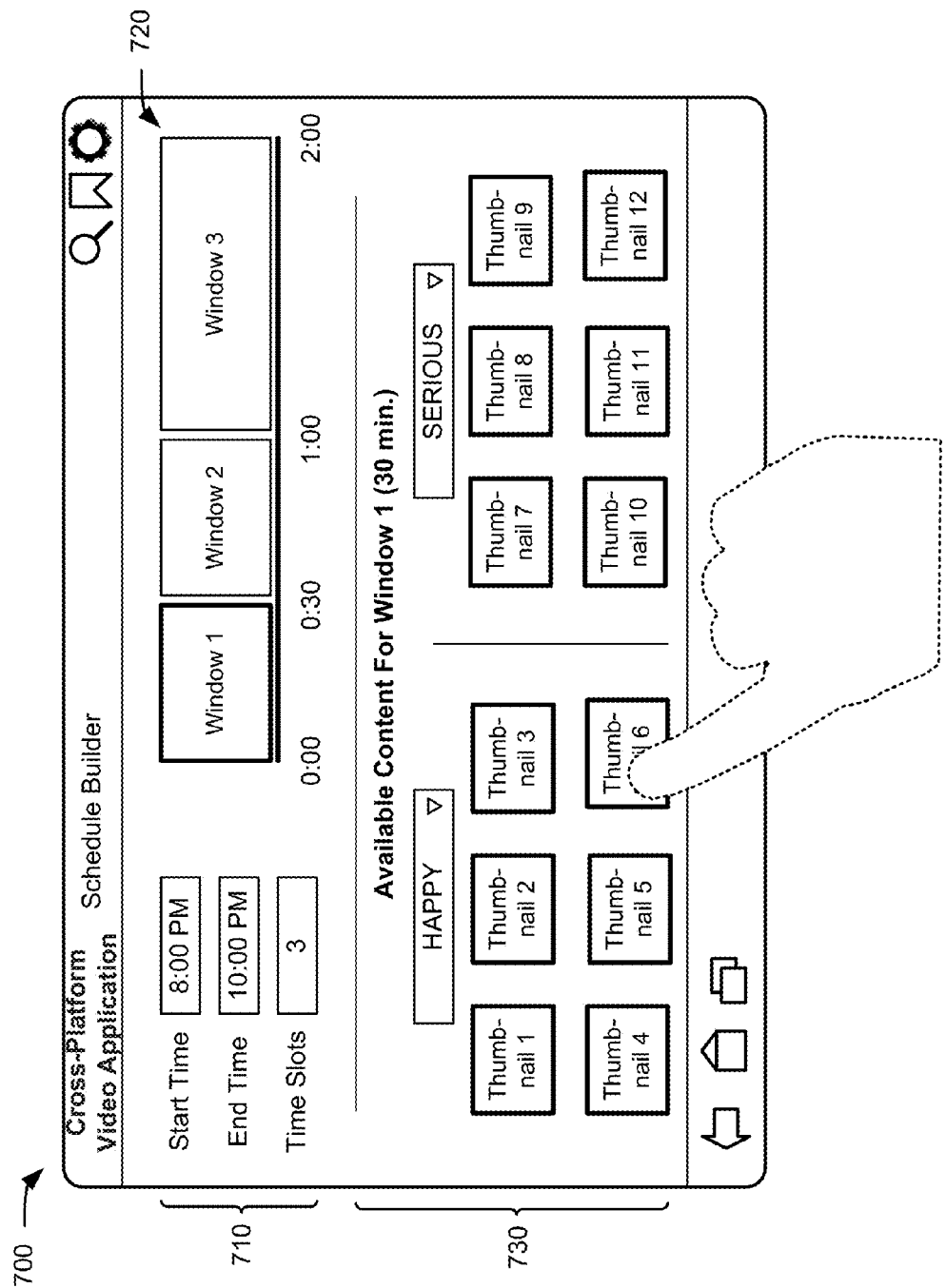
Figure 7C:
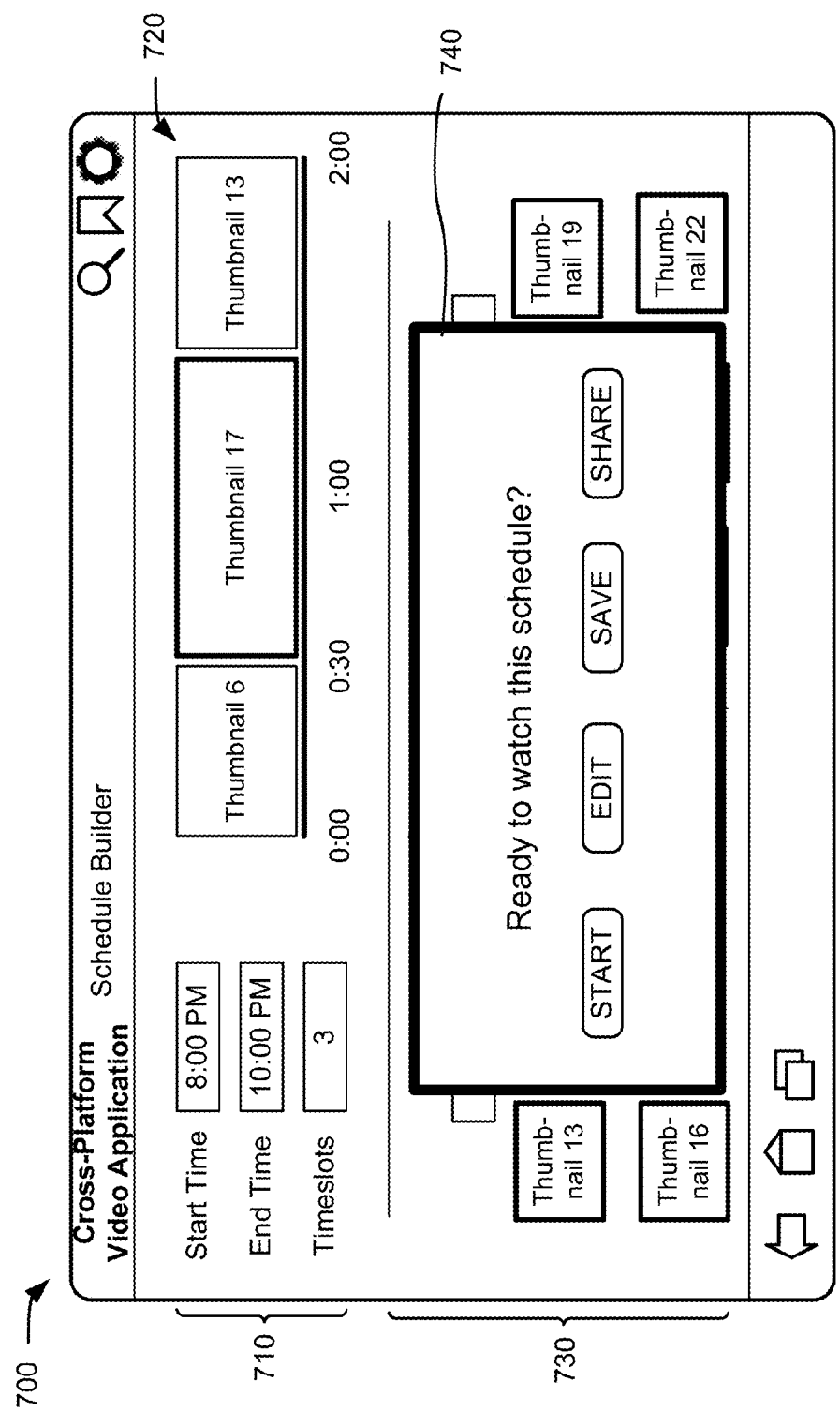

FIGS. 7A-7C illustrate an exemplary interface 700 associated with the schedule builder 560. Interface 700 may be presented, for example, in response to a user's selection of my schedule option 130 of user interface 100. As shown in FIG. 7A, interface 700 may include a schedule boundaries section 710, a schedule assembly graph 720, and content options 730. Schedule boundaries section 710 may include mechanisms to input a time period (e.g., a start time and end time, or a duration) and, in some cases, a number of windows, for a scheduled to be generated. The number of windows may define, for example, the number of different content items a user desires to view during the particular time period.

Schedule assembly graph 720 may provide a working interface to assemble and/or present a schedule. In one implementation, schedule assembly graph 720 may provide a graphical interface to present selected content items within the schedule context. For example, thumbnail images, text, or other metadata associated with selected content may be presented in each window. Schedule assembly graph 720 may also allow a user to re-order windows and/or adjust durations associated with each window.

Content options 730 may include content recommendations that may be used to populate schedule assembly graph 720. In one implementation, content options 730 may be populated via mood assistant 550 (e.g., based on a time period of a particular window in schedule assembly graph 720 and a mood-type identified within content options 730). Schedule builder 560 may, for example, present multiple options corresponding to a window selected by a user. In another implementation, schedule builder 560 may present content options related to a selected mood and/or other recommendation criteria, but irrespective of any window size (although still within a time limit for the selected overall duration from schedule boundaries section 710). In one implementation, schedule builder 560 may automatically populate schedule assembly graph 720 with "best" recommendations based on user input for schedule boundaries section 710 and default (or profile-based) moods.

Using interface 700, a user may select options from content options 730 to populate and/or change schedule assembly graph 720. Content options from content options 730 may be represented, for example, as blocks of time that may be arranged by a user. For example, a user may select and drag an icon from content options 730 into a window of schedule assembly graph 720. In some implementations, schedule builder 560 may automatically resize a window in schedule assembly graph 720 to match a time associated with selected content from content options 730. Although FIG. 7A includes two sections of content moods, in other implementations, more or fewer sections may be provided within content options 730.

As shown in FIG. 7B, indications of selected content (e.g., "thumbnail 6") may be presented in within schedule assembly graph 720. In one implementation, as shown in FIG. 7B, a user may adjust a window duration (e.g., by manipulating a visible size of a window 2), and schedule builder 560 may alter options in content options 730 to match the new window size (e.g., "1 hour").

As shown in FIG. 7C, when a user has filled available windows within schedule assembly graph 720, schedule builder 560 may present a recap window 740 with options to view, edit, save, and/or share the schedule in schedule assembly graph 720. User election of an item in recap window 740 may cause schedule builder 560 to perform the selected action. For example, selection of "start" may cause cross-platform application 405 to begin presenting content in accordance with schedule assembly graph 720. Selection of "edit" may allow the user adjust schedule assembly graph 720. Selection of "save" may cause user device 260 to store information in schedule assembly graph 720 (e.g., associated with a user profile) for future retrieval. Selection of "share" may cause schedule builder 560 to launch an interface to send a message with a link to the user's personalized schedule as reflected in schedule assembly graph 720.

Figure 8:
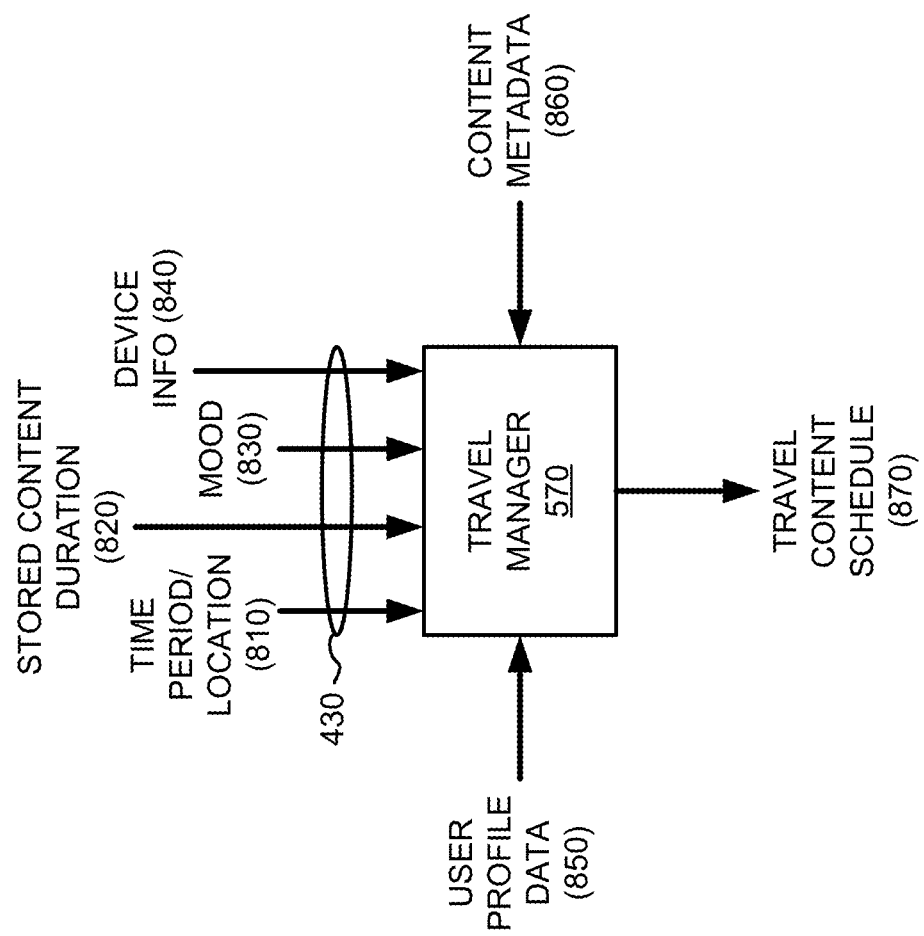
FIG. 8 is a diagram of exemplary communications associated with the travel manager of FIG. 5.

Returning to FIG. 5, travel manager 570 may provide intelligent scheduling for users that may be travelling or have other planned instances of limited and/or changing access to content. In one implementation, travel manager 570 may provide a user interface to input travel schedules. FIG. 8 provides exemplary communications associated with travel manager 570. For example, as shown in FIG. 8, travel manager 570 may solicit and receive user input (e.g., user input 430) including a time period and location 810 of planned travel, a stored content duration 820 (e.g., an amount of viewing time without access to, for example, network content), a user's mood 830, and device information 840 (e.g., device type, dimensions, capacity, etc. of a preferred user device 260 for travel). In one implementation, travel manager 570 may provide a user interface to solicit each of time period and location 810, stored content duration 820, user's mood 830, and device information 840.

Based on time period and location 810, stored content duration 820, user's mood 830, and device information 840, travel manager 570 (e.g., in conjunction with data center 220) may apply user profile data 850 and content metadata 860 to identify recommended content. Travel manager 570 may generate travel content schedule 870 that may be used to pre-load mood-based content that is appropriate for the preferred device (which may be different from a current device 260 for the user) and for the duration of travel.

For example, a user may input travel information indicating a two-day trip and a preference (e.g., mood) for drama. Travel manager 570 may confirm a preferred device type (e.g., for user device 260) with the user to identify, for example, screen dimensions, memory capacity, video processing capabilities (e.g., high-definition or standard definition), etc. during the travel period. Travel manager 570 may then queue two movies that can be downloaded on the preferred device (e.g., prior to a departure) and viewed during a flight.

In one implementation, travel manager 570 may build/identify habits for the user to influence content selection, formats, and preferred content delivery. For example, travel manager 570 may schedule new content (e.g., preload a new show the user has not seen before, but would likely be of interest) based on learned user habits. In one implementation, travel manager 570 may include in travel content schedule 870 teaser content, based on user habits, that may generate additional revenue. For example, travel manager 570 may provide free teaser content on one platform (e.g., preload at home over a WiFi network) that will likely trigger additional consumption on a different platform (e.g., cellular network.)

Referring back to FIG. 5, event planner 580 may provide a user interface to set up events on a calendar so that cross-platform application 405 (e.g., mood assistant 550 or another functional component) can compile a list of appropriate content for the event. Event planner 580 may coordinate with the other functional components of cross-platform application 405, such as mood assistant 550 and schedule builder 560, as wells as various backend preference data and profiles.

Figure 9:
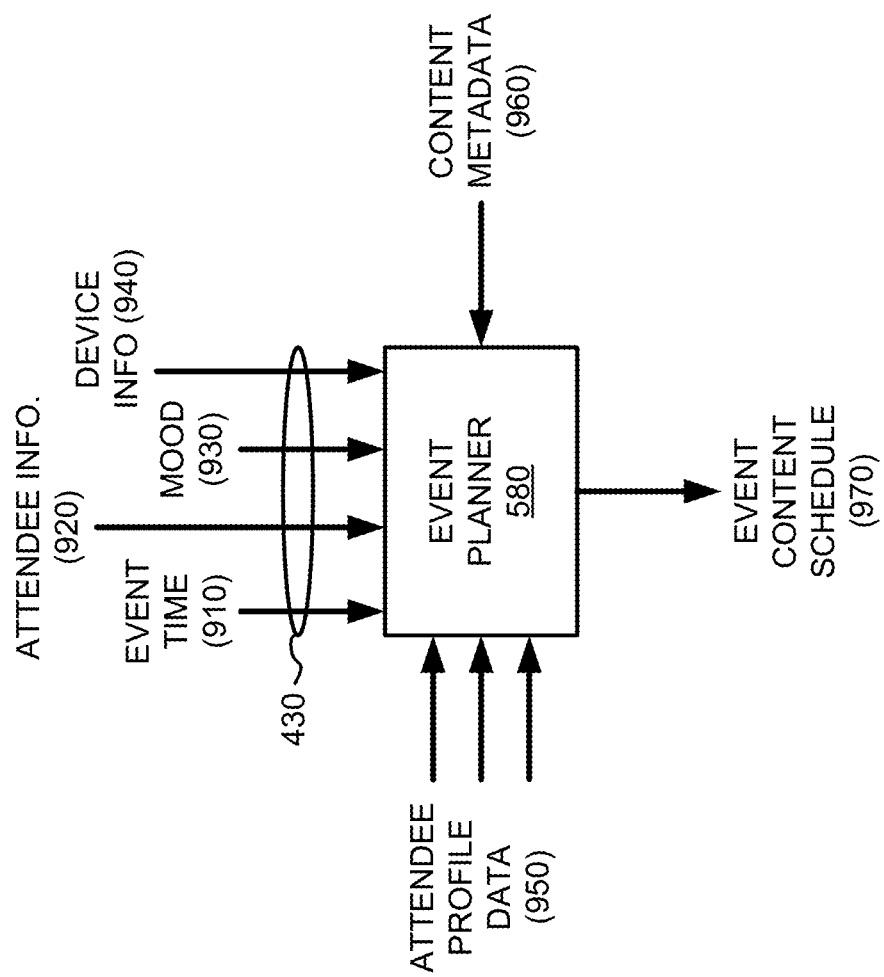
FIG. 9 is a diagram of exemplary communications associated with the content assistant module of FIG. 5.

FIG. 9 provides exemplary communications associated with event planner 580. As shown in FIG. 9, event planner 580 may solicit and receive user input (e.g., user input 430) including an event time 910, attendee information 920 (e.g., an amount of viewing time without access to, for example, network content), a mood 930, and device information 940 (e.g., device type, dimensions, capacity, etc. of a user device 260 for the event). Attendee information 920 may include, for example, profile names and/or contact information of potential event attendees. For example, attendee information 920 may be linked, for example, to a contact list associated with cross-platform application 405 or another application on user device 260. Mood 930 may include a mood or theme for corresponding to the event. In one implementation, event planner 580 may provide a user interface to solicit each of event time 910, attendee information 920, mood 930, and device information 940.

Based on event time 910, attendee information 920, mood 930, and device information 940, event planner 580 (e.g., in conjunction with data center 220) may apply attendee profile data 950 and content metadata 960 to identify recommended content that best fits the entire group of attendees. In one implementation, attendee profile data 950 may include, for example, store profiles of users who are also subscribers of service provider network 210. In another implementation, attendee profile data 950 may include profile data solicited from attendees (e.g., via an event announcement and/or attendee response). Event planner 580 may generate an event content schedule that may be used to pre-load mood-based content that is appropriate for the selected user device 260.

As an example, in conjunction with mood assistant 550, event planner 580 may enable a user to preconfigure an event in a calendar along with a list of friends attending the event. Event planner 580 can monitor content metadata 960 prior to the event (e.g., via query 440/response information 450) for shows that best match attendees' preferences and have them ready. In one implementation, event planner 580 may also permit a user to provide a theme/mood (e.g., mood 930) for the event to better inform the choices. Event planner 580 may find a preconfigured number shows (e.g., event content schedule 970) that match the preferences and have them ready for the event (e.g., by recording them on a DVR, or marking them on the appropriate provider account/queue, etc.). In one implementation, event planner 580 may periodically re-evaluate event content schedule 970 (e.g., in light of updated attendee profile data 950 and/or content metadata 960) until the time of the event in case better options become available between the time the event is added to the calendar and the start of the event.

In another implementation, an event can also be marked as "In Theatre," in which case event planner 580 can lookup (e.g., via query 460/response information 470) movies playing in the user's nearest/favorite theatres and make recommendations. If an in theater event includes multiple attendees, event planner 580 may send them all a set of recommendations and request preferences (e.g., via email or SMS or via notifications within cross-platform application 405). Event planner 580 may collect all the responses from the attendees and make a final recommendation. Event planner 580 may solicit approval from, for example, the event organizer (e.g., the user that initiated the "In Theater" event). In one implementation, once the 'In Theater' event is approved, event planner 580 can then book tickets for the show. For example, event planner 580 may execute an API with a partner content provider 250 (e.g., Fandango, MovieTickets, etc.) to order/reserve a ticket purchase. The tickets would then be ready for the attendees to pick up when they go to the theatre. Additionally, after the event, event planner 580 may prompt the user to provide a rating/review to, or example, tune the user's content preference profile for future recommendations.

In another implementation, an event can be marked as "Family Movie Night," which may include a recurring viewing event at home. Event planner 580 may, for example, find appropriate content beforehand (e.g., based on profiles/preferences of the attendee family members) and send notifications to all family members reminding them. In one implementation, event planner 580 may also manage DVR and/or TiVO content based on recording capacity, what the user has already watched, and new content that needs space.

The following use cases exemplify some features of cross-platform application 405 integrating multiple functional components. Assume a user expresses interest (e.g., bookmarks the content, a related series, etc.) in a movie/show to be aired the next day on live television on a platform that the user is already subscribed to and that falls within normal viewing hours for the user (e.g., based on user profile data). Cross-platform application 405 (e.g., schedule builder 560) may schedule a notification to be sent to the user 15 minutes before the show starts and add it to a virtual schedule for the user.

Assume, alternatively, the same movie/show is to be aired the next day on live television that the user is already subscribed to, but does not fall within normal viewing hours of the user. Cross-platform application 405 (e.g., schedule builder 560) may schedule for the movie/show to be recorded on the user's DVR or TiVo.

Assume, as another alternative, that the movie/show is now available on a content provider's VOD offerings for free. Cross-platform application 405 (e.g., schedule builder 560) may send the user an alert with the expiry date and include the movie/show as a possible recommendation within, for example, content options 730, travel content schedule 870, and/or event content schedule 970.

Assume, as another alternative, a user indicates he/she will not be at home during certain scheduled viewing hours. Cross-platform application 405 (e.g., schedule builder 560) review the content (e.g., in schedule assembly graph 720) for that time and make appropriate changes. For example, cross-platform application 405 may sets any live shows to record on DVR or add the shows to the universal queue if the shows are available from one of partner content providers 250 for streaming. Cross-platform application 405 may, as an example, add a show from schedule assembly graph 720 to a Hulu queue for later viewing.

Returning again to FIG. 5, platform interface data 590 may include, for example, APIs, URLs, login information (e.g., a user identifier and a password), queue synchronization information (which includes queues and watch lists from partner content providers 250, as well as the bookmarks in Cross-platform application 405), and other information to enable cross-platform application 405 to access content from content distribution system 230, partner content providers 250, and/or web content providers 255. In one implementation, platform interface data 590 may also include session-specific information, such as, for example, cookies, URLs, or other information to enable user device 260 to access content servers or digital rights management (DRM) servers associated with content distribution system 230, partner content providers 250, and/or web content providers 255.

Although FIG. 5 shows exemplary functional components of user device 260, in other implementations, user device 260 may include fewer, different, and/or additional functional components than depicted in FIG. 5. For example, platform interface data 590 is shown as a part of cross-platform application 405, in another implementation, platform interface data 590 may be a separate component outside of cross-platform application 405. Alternatively, or additionally, one or more functional components of user device 260 may perform one or more other tasks described as being performed by one or more other functional components of user device 260.

Figure 10:
FIG. 10 is a flow diagram of an exemplary process for providing content selection and scheduling in a cross-platform application.

FIG. 10 is a flow diagram of an exemplary process 1000 for providing content selection and scheduling in a cross-platform application. In one implementation, process 1000 may be performed by user device 260. In another implementation, some or all of process 1000 may be performed by another device or group of devices, including or excluding user device 260. For example, a device in service provider network 210 may perform one or more parts of process 1000.

As shown in FIG. 10, process 1000 may include presenting an interface providing access to content from multiple content providers having separate subscriptions (block 1010). For example, as described above in connection with FIG. 1, a cross-platform application for a user device may present a welcome screen 100 that allows a user to select from a variety of featured content which may be associated with multiple content providers.

Process 1000 may further include soliciting and receiving user input indicating selection criteria for recommending content (block 1020). For example, as described above in connection with FIG. 4, user device 260 may receive a user request via a user interface presented by cross-platform application 405. User input 430 may include, for example, a request via a selection assistant (e.g., associated with selection assistant option 120), a scheduling plan (e.g., associated with my schedule option 130), or an event request (e.g., associated with event planner option 140).

Process 1000 may also include providing an indication of the selection criteria to a data center (block 1030), and receiving, from the data center, information for providing recommended content options based on the selected criteria (block 1040). For example, as described above in connection with FIG. 4, in response to user input 430, user device 260 may provide a query 440 to data center 220. Query 440 may include, for example, a request for information to support a response to user input 430. For example, if user input 430 is a request for a content recommendation (e.g., via a selection assistant based on particular mood and/or timing criteria), query 440 may include a query for content that matches the particular mood and/or timing criteria. As another example, if user input 430 is a scheduling request, query 440 may include a query for content that corresponds to particular time periods. Query 440 may trigger data center 220 to provide response information 450 to user device 260.

Response information 450 may include, for example, a responsive subset of the compiled metadata from metadata 410 and metadata 420.

Process 1000 may also include presenting the recommended content options to the user (block 1050). For example, as described above in connection with FIGS. 4 and 6B, user device 260 may receive response information 450 and/or response information 470 and present results to a user. In the context of mood assistant 550, recommended content options may be presented to the user in recommendation section 660 to enable a user to select from one or more recommended options.

Process 1000 may also include monitoring content metadata from the multiple content providers (block 1060), and revising the recommended content options based on changes in the content metadata (block 1070). For example, as described above in connection with FIG. 5, cross-platform application 405 (e.g., event planner 580) may monitor content metadata 960 prior to an event (e.g., via query 440/response information 450) for shows that best match attendees' preferences. Event planner 580 may periodically re-evaluate event content schedule 970 (e.g., in light of updated attendee profile data 950 and/or content metadata 960) until the time of the event in case better options become available between the time the event is added to the calendar and the start of the event.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while a series of blocks has been described with respect to FIG. 10, the order of the blocks may be modified in other implementations. Further, non-dependent blocks may be performed in parallel.

It will be apparent that different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

Further, certain portions of the invention may be implemented as a "component" or "system" that performs one or more functions. These components/systems may include hardware, such as a processor, an ASIC, or a FPGA, or a combination of hardware and software. No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise.

What is claimed is:

1. A method, comprising:

presenting, by a user device and to a user, an interface providing access to content from multiple content providers and allowing user input to define selection criteria for recommending content;

receiving, by the user device and via the interface, a first user input indicating the selection criteria, wherein the selection criteria includes a content duration corresponding to an amount of time available to the user for viewing the content, a number of blocks of time the user desires within the amount of time available, a duration of each of the blocks of time, and a content category relating to a mood of the user for each of the blocks of time;

providing, by the user device and to a network device, an indication of the selection criteria;

receiving, by the user device and from the network device, information providing recommended content options based on the selection criteria, wherein the recommended content options are available from different content providers of the multiple content providers;

presenting, to the user and via the interface, the recommended content options corresponding to the selection criteria, wherein the interface includes a schedule assembly graph to enable the user to populate each of the blocks of time with user selections from the recommended content options corresponding to the number of blocks of time selected by the user within the amount of time available, wherein each of the blocks of time is represented by one corresponding graphical representation in the schedule assembly graph;

receiving, by the user device and via the interface, a second user input to alter a duration of one of the blocks of time in the selection criteria by manipulating a visible size of the corresponding graphical representation of the one of the blocks of time in the schedule assembly graph;

automatically updating, by the user device and via the interface, the recommended content options presented corresponding to the altered duration of the one of the blocks of time;

receiving, by the user device and via the interface, a third user input to select and drag an image representing a content option from the updated recommended content options into the corresponding graphical representation in the schedule assembly graph;

presenting an indication of the selected content option by replacing the graphical representation with the image; and including the selected content option within a series of scheduled content to fill the content duration in the schedule assembly graph.

2. The method of claim 1, wherein the presenting the recommended content options includes presenting thumbnail images of a portion of the recommended content options that correspond to a particular block of time, when the corresponding graphical representation for the particular block of time is selected by the user.

3. The method of claim 1, further comprising:

providing an interactive user interface to enable the user to forward the schedule assembly graph or a link to the schedule assembly graph to another user.

4. The method of claim 1, wherein the selection criteria for the content category relating to the mood of the user includes a selection from a genre that factors in information from a user's profile.

5. The method of claim 1, wherein the selection criteria further includes a preferred device type from which to view the content.

6. The method of claim 1, wherein the selection criteria further includes one or more of a screen dimension, a memory capacity, or a video processing capability of a preferred device type from which to view the content.

7. The method of claim 1, wherein the selection criteria further includes event attendee information, and wherein the user device solicits user profile information for each of multiple attendees.

8. The method of claim 1, further comprising:
monitoring content metadata from the multiple content providers; and
revising the recommended content options based on changes to the content metadata.

9. The method of claim 1, wherein the recommended content options are selected from items within one or more queues associated with the multiple content providers.

10. The method of claim 1, wherein the recommended content options include content from locally stored content, remotely stored content, live television content, or physical media.

11. The method of claim 1, further comprising:
storing, in a memory associated with the user device, at least a portion of digital content associated with the recommended content options.

12. The method of claim 11, wherein the at least a portion of digital content includes a preview of a full content presentation and wherein the method further comprises:
presenting, to the user, a link to access the full content presentation via one of the multiple content providers.

13. The method of claim 1, wherein the multiple content providers are selected from a group of subscription-based over-the-top (OTT) media providers.

14. A non-transitory computer-readable medium comprising computer-executable instructions, the computer-readable medium comprising one or more instructions to:
present, to a user, a user interface providing access to content from multiple content providers and allowing user input to define selection criteria for recommending content, each of the multiple content providers having a separate subscription associated with the user;
receive, via the user interface, a first user input indicating the selection criteria, wherein the selection criteria includes a content duration corresponding to an amount of time available to the user for viewing the content, a number of blocks of time the user desires within the amount of time available, a duration of each of the blocks of time, and a content category relating to a mood of the user for each of the blocks of time;
provide, to a network device, an indication of the selection criteria;
receive, from the network device, information providing recommended content options based on the selection criteria, wherein the recommended content options are available from different content providers of the multiple content providers;
present, to the user via the user interface, the recommended content options corresponding to the selection criteria, wherein the user interface includes a schedule assembly graph to enable the user to populate each of the blocks of time with user selections from the recommended content options corresponding to the number of blocks of time selected by the user within the amount of time available, wherein each of the blocks of time is represented by one corresponding graphical representation in the schedule assembly graph;
receive, via the user interface, a second user input to alter a duration of one of the blocks of time in the selection criteria by manipulating a visible size of the corresponding graphical representation of the one of the blocks of time in the schedule assembly graph;
automatically update the recommended content options presented corresponding to the altered duration of the one of the blocks of time;
receive, via the user interface, a third user input to select and drag an image representing a content option from the updated recommended content options into the corresponding graphical representation in the schedule assembly graph;
present an indication of the selected content option by replacing the graphical representation with the image; and
include the selected content option within a series of scheduled content to fill the content duration in the schedule assembly graph.

15. The computer-readable medium of claim 14, further comprising one or more instructions to:
generate, based on the information for providing recommended content options, a set of recommended content options for the user.

16. The computer-readable medium of claim 14, wherein the computer-readable medium further comprises one or more instructions to:
identify a user profile associated with the user; and
generate, based on the user profile and the information for providing recommended content options, a set of recommended content options for the user.

17. The computer-readable medium of claim 14, wherein the selection criteria further includes a future event time, and wherein the computer-readable medium further comprises one or more instructions to:
monitor content metadata from the multiple content providers; and
revise the recommended content options based on changes to the content metadata.

18. A user device, comprising:
a network interface including a transceiver to communicate with one or more remote systems;
one or more memories to store instructions; and
one or more processors configured to execute instructions in the one or more memories to:
present, to a user, a user interface providing access to content from multiple content providers and allowing user input to define selection criteria for recommending content;
receive, via the user interface, a first user input indicating the selection criteria, wherein the selection criteria includes a content duration corresponding to an amount of time available to the user for viewing the content, a number of blocks of time the user desires within the amount of time available, a duration of each of the blocks of time, and a content category relating to a mood of the user for each of the blocks of time;
provide, to a network device and via the network interface, an indication of the selection criteria;
receive, from the network device and via the network interface, information providing recommended content options based on the selection criteria, wherein the recommended content options are available from different content providers of the multiple content providers;
present, to the user via the user interface, the recommended content options corresponding to the selection criteria, wherein the user interface includes a schedule assembly graph to enable the user to populate each of the blocks of time with user selections from the recommended content options corresponding to the number of blocks of time selected by the user within the amount of time available, wherein each of the blocks of time is represented by one corresponding graphical representation in the schedule assembly graph;

receive, via the user interface, a second user input to alter a duration of one of the blocks of time in the selection criteria by manipulating a visible size of the corresponding graphical representation of the one of the blocks of time in the schedule assembly graph;

automatically update the recommended content options corresponding to the altered duration of the one of the blocks of time;

receive, via the user interface, a third user input to select and drag an image representing a content option from the updated recommended content options into the corresponding graphical representation in the schedule assembly graph;

present an indication of the selected content option by replacing the graphical representation with the image; and include the selected content option within a series of scheduled content to fill the content duration in the schedule assembly graph.

19. The user device of claim 18, wherein the one or more processors is further configured to execute instructions in the one or more memories to:

present the recommended content options with thumbnail images of a portion of the recommended content options that correspond to a particular block of time, when the particular block of time is selected by the user.

20. The user device of claim 18, wherein the selection criteria further comprises:

information for multiple attendees, and wherein the user device solicits user profile information for each of the multiple attendees.

\* \* \* \* \*